(12) United States Patent
Sutehall

(10) Patent No.: US 7,204,126 B2
(45) Date of Patent: Apr. 17, 2007

(54) BLOWN INSTALLATION OF OPTICAL FIBRES AND METHOD AND APPARATUS FOR DETERMINING THE LENGTH OF A PASSAGE ALONG WHICH AN OPTICAL FIBRE IS TO BE BLOWN

(75) Inventor: Ralph Sutehall, Newport (GB)

(73) Assignee: Prysmian Cables & Systems Limited, London (GB)

( * ) Notice: Subject to any disclaimer, the term of this patent is extended or adjusted under 35 U.S.C. 154(b) by 0 days.

(21) Appl. No.: 11/131,228

(22) Filed: May 18, 2005

(65) Prior Publication Data

US 2005/0265687 A1    Dec. 1, 2005

(30) Foreign Application Priority Data

May 21, 2004    (GB) ............................... 04253025.3

(51) Int. Cl.
*G01B 13/08* (2006.01)
(52) U.S. Cl. .......................... 73/37.5; 73/149; 73/37.7; 73/37.9; 385/147
(58) Field of Classification Search ................. 73/149, 73/37.5, 37.7, 37.9; 385/147
See application file for complete search history.

(56) References Cited

U.S. PATENT DOCUMENTS

| | | | | |
|---|---|---|---|---|
| 2,329,363 A | * | 9/1943 | Thomas | 137/495 |
| 3,839,899 A | * | 10/1974 | McMillen | 73/38 |
| 4,567,923 A | * | 2/1986 | Nalbach | 141/82 |
| 4,691,896 A | * | 9/1987 | Reeve et al. | 254/134.4 |
| 4,796,970 A | * | 1/1989 | Reeve et al. | 385/109 |
| 4,948,097 A | * | 8/1990 | Reeve et al. | 254/134.4 |
| 4,952,021 A | | 8/1990 | Aoki et al. | |
| 4,976,519 A | | 12/1990 | Davey et al. | |
| 5,042,907 A | | 8/1991 | Bell et al. | |
| 5,121,901 A | * | 6/1992 | Cassidy et al. | 254/134.4 |
| 5,169,126 A | * | 12/1992 | Reeve et al. | 254/134.4 |

(Continued)

FOREIGN PATENT DOCUMENTS

EP    0 108 590 A1    5/1984

(Continued)

OTHER PUBLICATIONS

Hiroyuki, T., "Measuring Method of Pipe Length", Patent Abstracts of Japan, JP Publication No. 61-025005, (Feb. 3, 1986).

(Continued)

*Primary Examiner*—Hezron Williams
*Assistant Examiner*—Samir M. Shah
(74) *Attorney, Agent, or Firm*—Finnegan, Henderson, Farabow, Garrett & Dunner, L.L.P.

(57) ABSTRACT

A method of determining a length $L_d$ at least representative of the length of a passage along which an optical unit or cable is to be installed by blowing, comprises the steps of flowing a pressurised gas into the passage at a substantially constant pressure $P_1$ and substantially constant flow rate $V_f$ until gas pressure within the passage reaches a predetermined level $P_2$. The time period $t_f$ during which the pressurised gas was flowed into the passage is determined and then the length $L_d$ is determined by reference to the time period $t_f$.

16 Claims, 2 Drawing Sheets

U.S. PATENT DOCUMENTS

| | | | |
|---|---|---|---|
| 5,456,450 A * | 10/1995 | Reeve et al. | 254/134.4 |
| 5,533,164 A | 7/1996 | Preston et al. | |
| 5,610,323 A * | 3/1997 | Ashworth | 73/40.5 R |
| 5,645,267 A * | 7/1997 | Reeve et al. | 254/134.4 |
| 5,760,294 A * | 6/1998 | Lehmann | 73/49.2 |
| 5,918,271 A * | 6/1999 | McGuigan | 73/49.1 |
| 6,101,304 A | 8/2000 | Quistorff et al. | |
| 6,173,107 B1 * | 1/2001 | Reeve et al. | 385/147 |
| 6,243,657 B1 | 6/2001 | Tuck et al. | |
| 6,311,267 B1 | 10/2001 | Nguyen et al. | |
| 6,311,953 B1 | 11/2001 | Lang et al. | |
| 6,328,283 B1 * | 12/2001 | Reeve et al. | 254/134.4 |
| 6,801,696 B2 | 10/2004 | Davis et al. | |
| 6,876,800 B2 | 4/2005 | Sutehall et al. | |
| 7,024,919 B2 * | 4/2006 | Arima et al. | 73/40.5 R |
| 2002/0128783 A1 | 9/2002 | Marcu et al. | |
| 2003/0056607 A1 | 3/2003 | Aronstam | |
| 2003/0123824 A1 | 7/2003 | Tatarka et al. | |
| 2004/0231401 A1 | 11/2004 | Sutehall | |
| 2005/0005679 A1 * | 1/2005 | Dingfelder et al. | 73/37.5 |

FOREIGN PATENT DOCUMENTS

FR      2 799 280      4/2001

OTHER PUBLICATIONS

Sirocco, "EPFU (Enhanced Performance Fibre Unit)", Pirelli Telecom Cables & Systems UK Ltd., (Mar. 4, 2002), 3 sheets.

Radius Systems, "MiniGlide & MicroGlide; Blown Fibre Cabling Systems", Uponor, 3 pages, (2002).

John Guest, "John Guest Product Ranges: Fibre Optic Fittings", John Guest—The World Leader in Push-in Fittings, Pipe and Plastic Plumbing Systems, http://www.johnguest.com/part_spec.asp?s=FIBRE, pp. 1-3, (May 19, 2003).

* cited by examiner

BLOWN INSTALLATION OF OPTICAL FIBRES AND METHOD AND APPARATUS FOR DETERMINING THE LENGTH OF A PASSAGE ALONG WHICH AN OPTICAL FIBRE IS TO BE BLOWN

CROSS-REFERENCE TO RELATED APPLICATIONS

This application claims priority of European Patent Application No 04 253025.3, filed 21 May 2004, the content of which is incorporated by reference.

FIELD OF THE INVENTION

The invention relates to blown installation of optical fibres and in particular to determining the length of a passage along which an optical fibre unit, or optical fibre cable, is to be installed by blowing. The invention is particularly, but not exclusively, directed to determining the length of such passages when defined by ducting into which an optical fibre is to be installed.

BACKGROUND TO THE INVENTION

Blown fibre installations may comprise ducting or any type of passage along which an optical fibre cable, or an optical fibre unit can be blown. Optical fibre units suitable for blown installation are known, for example from U.S. Pat. No. 5,533,164 and U.S. Pat. No. 5,042,907. Such optical fibre units may include single fibres, bundles of fibres or ribbon of fibres. Optical fibre cables suitable for blown installation are known, for example, from US 2003/0228116A1 and U.S. Pat. No. 4,976,519.

Optical fibre units or cables can be blown, for example, inside cables previously installed, as described for example in U.S. Pat. No. 6,101,304. US 2004/0037522 and US 2003/0123824 or into ducts properly designed, such as described in U.S. Pat. No. 6,328,283 and U.S. Pat. No. 6,311,267.

Methods for installing an optical cable into a duct are known, for example, from U.S. Pat. No. 6,311,953 and U.S. Pat. No. 5,645,267.

Ducting for blown installation of optical fibre units or optical fibre cables can be up to 5 km long and typical internal diameters for such ducting are 20, 25, 33 and 40 mm. The optical fibre cables that are blown along such ducts will typically have a diameter of 13 to 25 mm. Such ducting systems may be installed long before the optical fibre cable is installed and will often be installed by someone other than the installer of the cable. As a consequence, the person installing the optical fibre cable may not know the length of the ducting.

It is important to know the length of the ducting so that the maximum installation distance of the optical fibre cable is not exceeded. It may be possible to measure the ducting length using a measuring wheel. However, this will be a time-consuming process in view of the typical installation lengths and in many cases, may not be possible. This is because it is often not possible to gain access to the route taken by the ducting, which will typically be buried, or otherwise hidden from view.

It is also important for the installer of the optical fibre cable to know the condition of the ducting. Ducting systems are typically made up of a plurality of lengths of ducting connected together using air-tight connectors. If the connectors are not assembled correctly, it is possible for there to be an air leak at the duct/connection interface. Such air leaks reduce the airflow through the ducting system and reduce the installation distance for the optical fibre cable.

SUMMARY OF THE INVENTION

The applicant has tackled the problem of providing a technique that enables an installer of optical fibre units or optical fibre cables to determine the length of a passage, tube or duct into which an optical fibre unit or optical fibre cable is to be installed by blowing.

The applicant has found that a length $L_d$ at least representative of the length of a passage along which an optical fibre cable or unit is to be installed by blowing can be determined by flowing a pressurised gas into said passage at a substantially constant pressure $P_1$ and substantially constant flowrate $V_f$, determining the time $t_f$ taken to provide a predetermined gas pressure $P_2$ within said passage and determining said length $L_d$ by reference to said time $t_f$.

The invention also includes a method of determining a length at least representative of a length of ducting in which an optical fibre unit or cable is to be installed by blowing, the ducting having a first end and a second end and the method comprising:

connecting a compressor with said first end of the ducting;
providing sealing at said second end of the ducting;
supplying a gas at a substantially constant pressure $P_1$ and substantially constant flowrate $V_f$ from said compressor into said ducting until a predetermined pressure $P_2$ exists in said ducting;
determining the time period $t_f$ during which said gas was supplied into said ducting;
determining a volume $V_d$ indicative of a volume defined by said ducting by determining a pumped gas volume $V_1$ by multiplying said flowrate $V_f$ by said time period $t_f$ and the relationship $$\frac{P_1 V_1}{P_2} = V_d; \text{ and}$$

determining a length $L_d$ at least representative of the length $L_d$ of said ducting by reference to said volume $V_d$ and an inside diameter of said ducting.

The invention also includes a computer program product comprising one or more computer program software portions which, when executed in an execution environment, are operable to implement one or more of the steps of the method according to either of the last two preceding paragraphs.

The invention also includes a data storage medium having at least one of the computer software portions of the last preceding paragraph.

The invention also includes a microcomputer provided with a data storage medium as specified in the last preceding paragraph.

The invention also includes apparatus for determining a length ($L_d$) at least representative of a length of a passage along which an optical fibre unit or cable is to be installed by blowing, said apparatus comprising a flow control device for receiving a supply of compressed gas and outputting said compressed gas at a substantially constant pressure ($P_1$) and flow rate ($V_f$) for supply to a said passage and a computing system that determines said length ($L_d$) of a said passage to which said gas is output based on signals indicative of a time period ($t_f$) in which gas output by said flow control device is supplied to said passage to raise the pressure in said passage to a predetermined pressure ($P_2$).

BRIEF DESCRIPTION OF THE DRAWINGS

In order that the invention may be well understood, embodiments thereof, which are given by way of example only, will now be described with reference to the drawings, in which.

DESCRIPTION OF THE EMBODIMENTS

Figure 1:
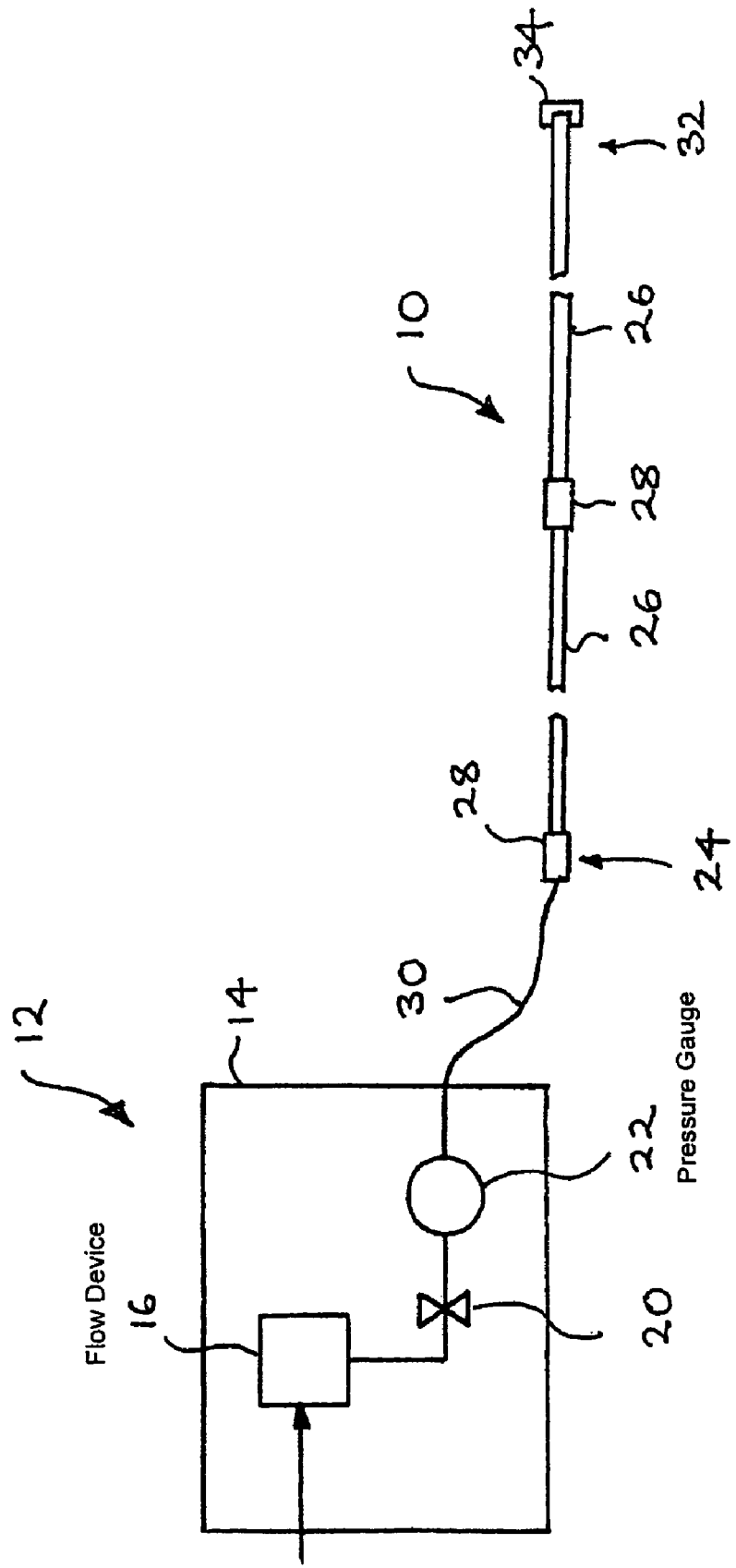
FIG. 1 is a schematic illustration of an optical fibre ducting system and an optical fibre ducting system length determining apparatus for determining the length of the ducting system.

Referring to FIG. 1, an optical fibre ducting system 10 is shown connected to an optical fibre ducting system length determining apparatus 12. The ducting system 10 is empty prior to the installation of an optical fibre cable. The ducting system 10 defines a passage along which optical fibre cables can be installed by blowing.

The optical fibre ducting system length determining apparatus 12 comprises a housing, or support, 14 for a pressurised gas supply device 16. The device 16 includes a compressor provided with pressure and flow gauges. The device 16 is configured to receive air at atmospheric pressure and provide pressurised air at a predetermined flow rate and pressure. A suitable commercially available device is produced, for example, by Factair Ltd of Ipswich in the United Kingdom.

On its outlet side, the device 16 is connected to the inlet side of a flow valve 20. On its outlet side, the flow valve 20 is connected to a pressure gauge 22 and further downstream, to an upstream end 24 of the ducting system 10.

The ducting system 10 comprises a plurality of lengths of ducting 26 that are interconnected by air-tight connectors 28. In the drawing, two lengths of ducting 26 are shown connected by a single air-tight connector 28. However, it will be understood that the ducting system 10 may comprise three or more lengths of ducting interconnected by an appropriate number of air-tight connectors, or a single length of ducting. A suitable air-tight connector 28 is fitted to the end 24 of the ducting system to permit connection with the length determining apparatus 12 via a tube 30. Preferably, the arrangement is such that the tube 30 is connectable to an airtight connector 28 of the type used to connect the lengths of ducting. However, it will be understood that a specially designed, or otherwise different connector arrangement could be provided for connecting the tube 30 to the end 24 of the ducting system 10.

The ducting system may comprise ducting 26 and connectors 28 as supplied by Radius Plastics Ltd of Newry, Northern Ireland, or Emtelle UK Limited of Hawick, Scotland. Suitable connectors are also provided by Plasson Ltd of Israel.

The ducting system 10 is installed without optical fibre cabling and may be installed and located in any conventional and convenient way. The optical fibre cabling is installed later by blowing the optical fibre cable along the ducting. Prior to installation of the optical fibre cabling, the installer can determine the length of the ducting system 10 using the length determining apparatus 12.

To determine the length of the ducting system 10, the length determining apparatus 12 is coupled to the ducting system by means of the tube 30 and air-tight connector 28. The other end 32 of the ducting system 10 is capped using a pressure-retaining cap 34.

With the ducting system 10 connected to the length determining apparatus 12 and the end 32 capped, the compressor of the gas supply device 16 is started. Once the compressor has settled in a required operating state, the flow valve 20 is opened to permit compressed air from the compressor to flow into the ducting system 10. The air flows into the ducting system 10 at a constant pressure $P_1$ and flow rate $V_f$ is determined by the flow device 16. The flow valve 20 is a simple on/off valve, It does not have any pressure/flow regulation function and is sufficiently large as to not impede the flow of air from the device 16.

When the flow valve 20 is opened, the operator commences timing the filling of the ducting system 10 while observing the pressure gauge 22. When the gauge 22 indicates that a predetermined pressure $P_2$ has been reached, the flow valve 20 is closed and the timing process is stopped. With the flow valve 20 closed, the pressure gauge 22 can be monitored to determine whether the ducting system 10 is airtight; a drop in the pressure registered by the pressure gauge 22 would indicate a leak in the ducting system.

The operator uses the filling time $t_f$ to determine the length of the ducting system 10. Knowing the flow rate $V_f$ of compressed air supplied by the device 16 and the time $t_f$ taken to reach the predetermined pressure $P_2$ at which the timing process is stopped, the operator is able to determine the volume $V_1$ of air that has been pumped into the ducting system 10 ($V_1 = t_f V_f$). The diameter $d_d$ of the ducting 26 is known, or can be measured, and knowing this and the volume $V_1$ it is possible to determine the length $L_d$ of the ducting system.

For the purpose of determining the length $L_d$ of the ducting system, the air in the system can be considered to behave as an ideal gas and since its temperature will for practical purposes be a constant, Boyle's law applies.

Therefore
  $PV = n$
  where:
  $P$ = pressure
  $V$ = volume
  $n$ = a constant
From this relationship it can be determined that
  $P_1 V_1 = P_2 V_2$
  where:
  $P_1$ = pressure at which the air is supplied from the gas supply device 16
  $V_1$ = the volume of air pumped into the ducting system
  $P_2$ = the predetermined pressure at which the flow valve 20 is closed
  $V_2$ = the volume between flow valve 20 and retaining cap 34 and $$V_2 = \frac{P_1 V_1}{P_2}.$$

The volume $V_2$ will approximate to the volume $V_d$ of the ducting system 10. It will be appreciated that this does not take account of the volume of the piping between the flow valve 20 and the connector 28 and, hence, $V_d \approx V_2$. However, in terms of the volume $V_d$ of the ducting system 10, which could, for example be 5 km long, this volume is negligible and can be discounted. Obviously, it would be possible to determine this unknown so that it could be taken into account in order to arrive at a more accurate result, but for practical purposes, this is not considered necessary.

Since the inside diameter d of the ducting system can readily be determined by measurement and the volume $V_d$ of the ducting system has been determined, it is possible to determine the length $L_d$ of the ducting system, since $$V_d = \frac{\pi d^2}{4} L_d$$

and therefore $$\frac{4V_d}{\pi d^2} = L_d$$

It will be appreciated that knowing the pressures $P_1$ and $P_2$, the volume $V_1$ and the diameter d of the ducting system 10, the installer can readily carry out the calculations necessary to determine the length $L_d$ of the ducting system. As an alternative to having the installer calculate the length $L_d$, graphs for different diameters of ducting with time plotted against length for a specified pressure $P_2$ and flow rate $V_f$ could be supplied so that the installer would simply read the length off of the graph with reference to the time. As yet another alternative, lookup tables could be provided allowing the installer to determine the ducting system length from the time $t_f$, flow rate $V_f$, pressure $P_2$ and ducting system diameter d.

Figure 2:
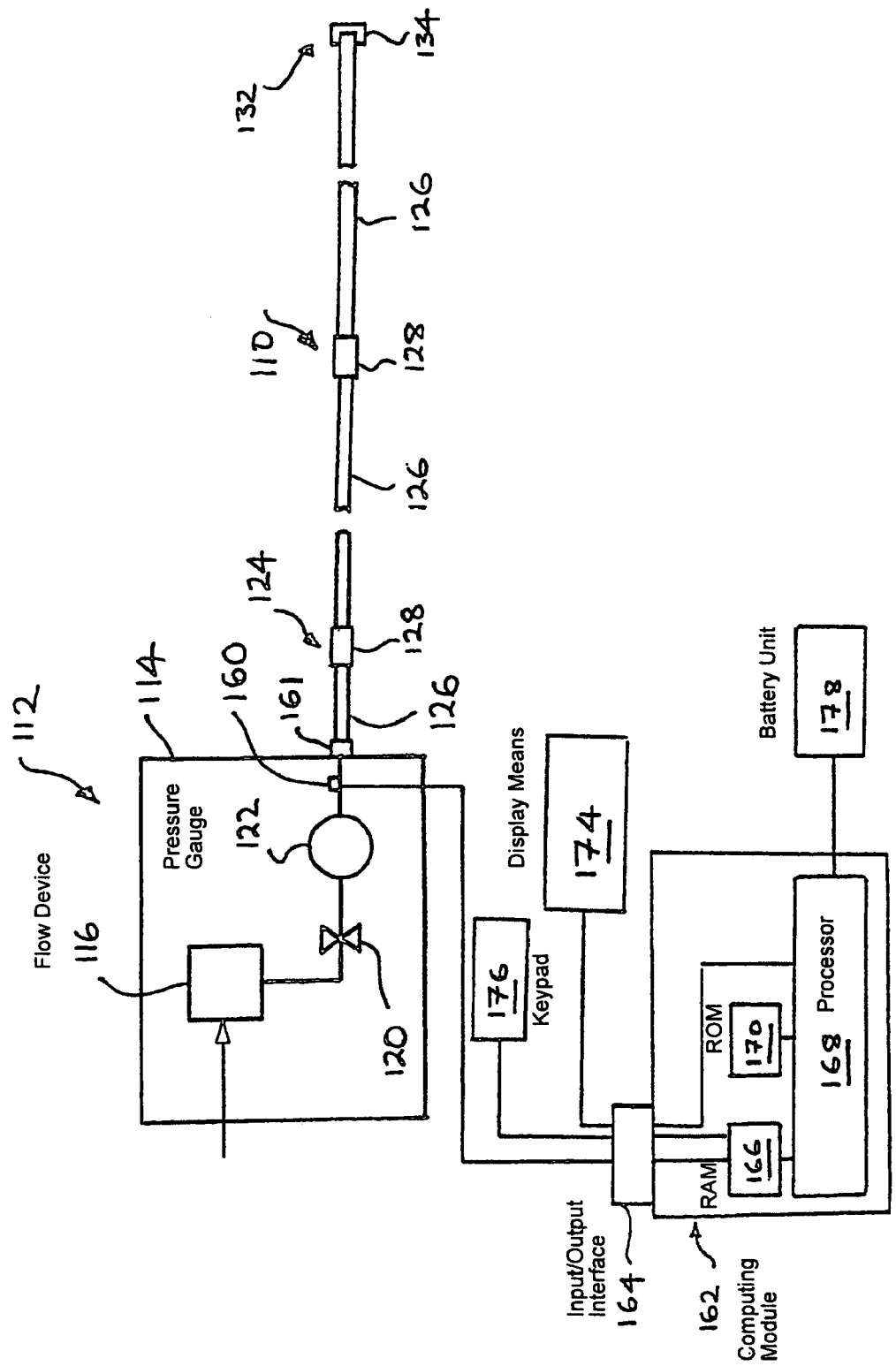
FIG. 2 is a schematic illustration of a modified version of the apparatus of FIG. 1.

In a preferred embodiment described below with reference to FIG. 2, the timing process and determination of the length of the ducting system is carried out automatically by the length determining apparatus, which is provided with onboard computing means.

In describing the preferred embodiment of an optical fibre ducting system length determining apparatus 112 shown in FIG. 2, components described in connection with the apparatus 10 are given the same reference numeral incremented by 100 and will not be described again in any detail.

The apparatus 112 includes a pressure transducer 160, which can be located at any appropriate position in which it can sense the pressure of the gas in the ducting system 10. This can be anywhere downstream of the gas supply device 116. Preferably, the pressure transducer is mounted in the housing 114, downstream of the flow valve 120. As explained in more detail below, if the pressure transducer senses the ducting system pressure from a location downstream of the flow valve 120 it can be used in determining the ducting system length and monitoring the pressure in the ducting system to check for gas leaks.

In this embodiment, a connector 161 mounted on the housing 114 connects with the upstream end 124 of the ducting system 110 by means of a short length of ducting 126.

The pressure transducer 160 is shown positioned downstream of the pressure gauge 122. It will be understood that in this embodiment, the pressure gauge 122 could be omitted. However, it may be useful for an operator to be able to view the pressure and so the pressure gauge may be retained. Alternatively, a display (not shown), could be provided to show the pressure sensed by the pressure transducer 160.

The pressure transducer 160 provides a signal indicative of the pressure sensed and communicates the signal to a computing module 162 via an input/output interface 164, which may include an analogue to digital (a/d) converter. The input/output interface 164 is connected to a random access memory (RAM) 166 in which signals from the pressure transducer 160 can be stored for access by a processor (CPU) 168. The computing module also has a read only memory (ROM) 170 in which an operating program and data are stored. The CPU 168 outputs digital data to the input/output interface 164, which is connected to a display means 174, which could for example be an LCD. The computing module is also provided with an input device, such as a keypad 176, by means of which an operator may input data such as the diameter of the ducting 26. The keypad 176 is connected to the RAM 166 via the input/output interface 164. Data input by the operator and held in the RAM 166 can be accessed by the CPU.

The computing module 162 may be powered by a battery unit 178, which may be rechargeable. A suitable converting unit may be provided between the battery unit 178 and the components of the computing module that require electrical power, so that each receives electrical energy in the required form. Alternatively, the computing module 162 can be designed to be powered by an ac mains electrical supply, such as the 240 V ac supply available in the United Kingdom.

The ROM 170 will store suitable software for operating the computing module 162, including an algorithm for determining the length $L_d$ of the ducting system 10 from the data received in and stored by the RAM 166 and data held in the ROM 170. More sophisticated systems may allow the installer to select the measurement units to be used.

For the purpose of timing the supply of air to the ducting system 10, the computing module 162 may be provided with a timer, not shown. Alternatively, use may be made of the CPU's internal clock. The timing process may be initiated by providing a suitable key, or switch, so that the operator can start timing the supply process when the flow valve 120 is opened. Alternatively, the timing process could be initiated automatically, for example, by a signal from the flow valve 120 indicating that it has been opened. The flow valve 120 could be provided with a microswitch or the like to provide an indication that the valve has been opened.

While the timing process is in operation, pulses from the timer are collected in a register to permit the time to be determined. As with the initiation of the timing process, termination can be manual. Alternatively, the termination of the timing process could be ordered by the CPU when the pressure signal from the pressure transducer 160 indicates that the predetermined pressure has been reached.

The ROM may contain data, in the form of look-up tables that will allow the length of the ducting system to be determined from the time measurement. The data could mirror the graphical representations described above. Alternatively, the flow rate permitted by the flow device 116 and the predetermined pressure to which the ducting system is fitted would also be stored in the ROM. In this case, the CPU would operate on the basis of a suitable algorithm to determine the ducting system length $L_d$ by reference to stored data and the time measurement using the relationships $$V_1 = t_f \cdot V_f, \quad V_2 = \frac{P_1 V_1}{P_2} = V_d \quad \text{and} \quad \frac{4V_d}{\pi d^2} = L_d$$

The CPU 168 would output the determined length $L_d$ to the LCD 174 for display to the operator.

The computing module 162 can be designed to monitor the pressure in the ducting system 10 to determine whether there is gas leakage. A leak will be indicated if the pressure falls below the level $P_2$. If leakage is detected, this can be notified to the installer visually, via the display 174 or a light source, for example an LED, and/or audibly.

It will be appreciated that the components and circuitry of the computing module 162 have been described in brief and that other components may be included. However, such additional components and the implementation of a suitable algorithm will all be readily apparent to those skilled in the art and will not therefore be described in any detail.

It should be noted that care needs to be taken in selecting the pressure $P_2$ that is the predetermined pressure to which the ducting system is filled. It is important that the gas flow rate and the supply pressure $P_1$ are substantially constant. When the gas is introduced into the ducting system, the flow rate set by the flow device 16 will be constant until the pressure in the ducting system gets to a certain level. Once that level is reached, the air flow will start to reduce and so the predetermined pressure $P_2$ must be below that level.

For more accurate length determination, it may be desirable to take into account the coefficient of friction the internal wall of the passage into which the optical fibre unit, or cable, is to be installed. This is because the frictional properties of the wall may affect gas flow into the passage and, therefore, the time taken to fill the passage to the predetermined pressure $P_2$.

It is envisaged that an apparatus for determining a length at least representative of the length of a passage or ducting into which an optical fibre unit or cable is to be installed by blowing may comprise a unit comprising a constant pressure and flow device which receives a supply of pressurised gas and provides an output at a substantially constant pressure and flow rate. The unit would preferably comprise a computing module that can determine the length $L_d$ of such a passage or ducting based on signals indicative of the time period $t_f$ in which gas is supplied from the flow device to such a passage or ducting. Preferably, the flow device would include a part defining an orifice, or aperture, of predetermined diameter to ensure a constant flow rate. The unit could further comprise pressure gauges and/or on/off valves as described in connection with FIGS. 1 and 2. It is envisaged that the unit would be provided with a suitable inlet device permitting connection to a pressurised gas supply, such as a compressor.

Although the present invention has been described with reference to the installation into ducting, it is understood that the method and apparatus of the present invention may be used in connection with any type of passage suitable for blown installation of an optical fibre cable or an optical fibre unit, such as for example the passage defined internally by a hollow cable.

The invention claimed is:

1. A method of determining a length $L_d$ at least representative of the length of a passage along which an optical fibre cable or unit is to be installed by blowing, said method comprising the steps of flowing a pressurized gas into said passage at a substantially constant pressure $P_1$ and substantially constant flowrate $V_f$, determining the time $t_f$ taken to provide a predetermined gas pressure $P_2$ within said passage and determining said length $L_d$ by reference to said time $t_f$.

2. A method as claimed in claim 1, further comprising determining a volume $V_d$ at least approximating to a volume defined by said passage by reference to said flowrate $V_f$ and said time $t_f$.

3. A method as claimed in claim 2, further comprising determining a volume $V_1$ of gas flowed into said passage by multiplying said flow rate $V_f$ by said time period $t_f$ and determining said volume $V_d$ from the relationship $$\frac{P_1 V_1}{P_2} = V_d.$$

4. A method as claimed in claim 3, wherein said length $L_d$ is determined from the relationship $$L_d = \frac{4(V_d)}{\pi d^2}$$

where d is the diameter of said passage.

5. A method as claimed in claim 2, wherein said volume $V_d$ is determined by a computing module.

6. A method as claimed in claim 1, comprising determining said length $L_d$ by reference to said time period $t_f$ by reference to a plot of length against time for a specified passage diameter, said flowrate $V_f$, and said predetermined pressure $P_2$.

7. A method as claimed in claim 1, wherein said length $L_d$ is determined by a computing module.

8. A method as claimed in claim 1, wherein said passage is defined by ducting (10).

9. A method as claimed in claim 1, further comprising monitoring said pressure $P_2$ to determine the presence of a gas leakage.

10. A method as claimed in claim 1, wherein said gas is compressed air.

11. A method of determining a length at least representative of a length of ducting in which an optical fibre unit or cable is to be installed by blowing, the ducting having a first end and a second end and the method comprising:
connecting a compressor with said first end of the ducting;
providing sealing at said second end of the ducting;
supplying a gas at a substantially constant pressure $P_1$ and substantially constant flowrate $V_f$ from said compressor into said ducting until a predetermined pressure $P_2$ exists in said ducting;
determining the time period $t_f$ during which said gas was supplied into said ducting;
determining a volume $V_d$ indicative of a volume defined by said ducting by determining a pumped gas volume $V_1$ by multiplying said flowrate $V_f$ by said time period $t_f$ and the relationship $$\frac{P_1 V_1}{P_1} = V_d; \text{ and};$$

and
determining a length $L_d$ at least representative of the length $L_d$ of said ducting by reference to said volume $V_d$ and an inside diameter of said ducting.

12. A method as claimed in claim 11, further comprising monitoring said pressure $P_2$ in said ducting after said step of supplying said gas to determine the presence of gas leakage.

13. A method as claimed in claim 11, further comprising the step of determining said length $L_d$ at least representative of said length of the ducting by means of the relationship $$\frac{4(V_d)}{\bullet d^2} = L_d$$

where d is said inside diameter.

14. A method as claimed in claim 11, wherein said gas is compressed air.

15. Apparatus for determining a length ($L_d$) at least representative of a length of a passage along which an optical fibre unit or cable is to be installed by blowing, said apparatus comprising a flow control device (16; 116) for receiving a supply of compressed gas and outputting said compressed gas at a substantially constant pressure ($P_1$) and flow rate ($V_f$) for supply to a said passage and a computing system that determines said length ($L_d$) of said passage to which said gas is output based on signals indicative of a time period ($t_f$) in which gas output by said flow control device is supplied to said passage to raise the pressure in said passage to a predetermined pressure ($P_2$).

16. Apparatus as claimed in claim 15, further comprising a compressor, said flow control device being integral with said compressor.

* * * * *